United States Patent
Chiu et al.

(10) Patent No.: US 8,292,489 B2
(45) Date of Patent: Oct. 23, 2012

(54) SIDE LIGHT BACKLIGHT MODULE WITH BACK PLATE ASSEMBLY HAVING CASES THAT ARE SECURED BY BOLTS

(75) Inventors: Kuan-Her Chiu, Taipei (TW); Irene Chen, Taipei (TW)

(73) Assignee: Advanced Optoelectronic Technology, Inc., Hsinchu Hsien (TW)

( * ) Notice: Subject to any disclaimer, the term of this patent is extended or adjusted under 35 U.S.C. 154(b) by 356 days.

(21) Appl. No.: 12/727,253

(22) Filed: Mar. 19, 2010

(65) Prior Publication Data

US 2010/0271845 A1 Oct. 28, 2010

(30) Foreign Application Priority Data

Apr. 22, 2009 (TW) ................................ 98113272 A

(51) Int. Cl.
*F21V 7/00* (2006.01)
*G09F 13/04* (2006.01)
(52) U.S. Cl. ....................... 362/634; 362/97.1
(58) Field of Classification Search .............. 349/58–60, 349/65; 362/97.1–97.3, 632–634
See application file for complete search history.

(56) References Cited

U.S. PATENT DOCUMENTS

| | | | |
|---|---|---|---|
| 6,392,724 B2* | 5/2002 | An et al. | 349/58 |
| 6,502,945 B2 | 1/2003 | Kim et al. | |
| 7,832,091 B2 | 11/2010 | Kazama et al. | |
| 2003/0092471 A1* | 5/2003 | Kim et al. | 455/566 |
| 2006/0109616 A1* | 5/2006 | Lee et al. | 361/681 |
| 2008/0088772 A1* | 4/2008 | Cheng | 349/65 |
| 2008/0106911 A1* | 5/2008 | Park et al. | 362/612 |
| 2009/0160745 A1* | 6/2009 | Kim | 345/87 |

FOREIGN PATENT DOCUMENTS

| | | |
|---|---|---|
| CN | 1662124 A | 8/2005 |
| TW | 1280092 | 4/2007 |
| TW | 200722760 A | 6/2007 |
| TW | 1284227 | 7/2007 |

* cited by examiner

*Primary Examiner* — Sikha Roy
*Assistant Examiner* — Steven Horikoshi
(74) *Attorney, Agent, or Firm* — Altis Law Group, Inc.

(57) ABSTRACT

A back plate assembly utilized in a side light type backlight module includes two cases each including a main plate, a side plate extending upwardly extending from an end of the main plate and a pressing plate inwardly extending from a free end of the side plate. An opposite end of the main plate of one of the cases has a first stepped portion extending inwardly from a top portion thereof, and an opposite end of the main plate of the other one of the cases has a second stepped portion extending inwardly from a bottom portion thereof. A plurality of bolts extend through the second and first stepped portions and secure the cases together. A space is defined between the first and second cases for receiving a light guiding plate and a reflection plate between the main plates and the light guiding plate.

2 Claims, 3 Drawing Sheets

SIDE LIGHT BACKLIGHT MODULE WITH BACK PLATE ASSEMBLY HAVING CASES THAT ARE SECURED BY BOLTS

BACKGROUND

1. Technical Field

The disclosure relates to side light type backlight modules with back plate assemblies and, more particularly, to a side light type backlight module with a back plate assembly which can facilitate assembling and dissembling of the side light type backlight module.

2. Description of Related Art

Recently, LCDs (liquid crystal displays) have been in widespread use as display devices for compact electronic apparatuses. Typical LCDs not only provide good quality images with little power consumption, but also are very thin. The liquid crystal in a LCD does not emit any light itself. The liquid crystal has to be lighted by a light source so as to clearly and sharply display the texts and images that the LED intends to show. Thus, a backlight module is generally needed for a liquid crystal display device.

A conventional side light type backlight module includes a plurality of light sources and a back plate assembly. The back plate assembly includes a metal bezel and four individual elongated frames connecting with the metal bezel. Each of the frames has an elongated slot for receiving a corresponding light source therein.

However, the metal bezel and the frames are separately manufactured and then assembled together. The assembly of the parts of the conventional side light type backlight module is complicated, which results in a high cost of the backlight module. Further, to disassemble the conventional backlight module for maintenance is quite troublesome.

What is need, therefore, is a side light type backlight module with a back plate assembly which can overcome the disadvantage of the prior art.

DETAILED DESCRIPTION

Figure 1:
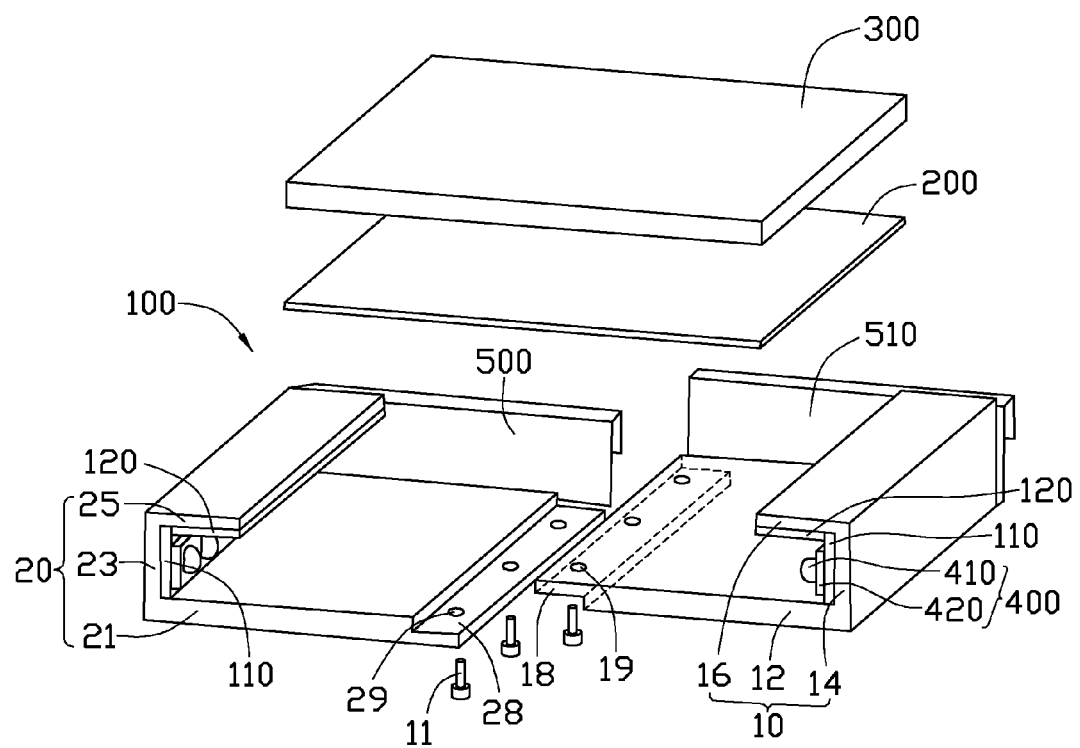
FIG. 1 is an isometric, exploded view of a side light type backlight module with a back plate assembly in accordance with a first embodiment of the disclosure.
Figure 2:
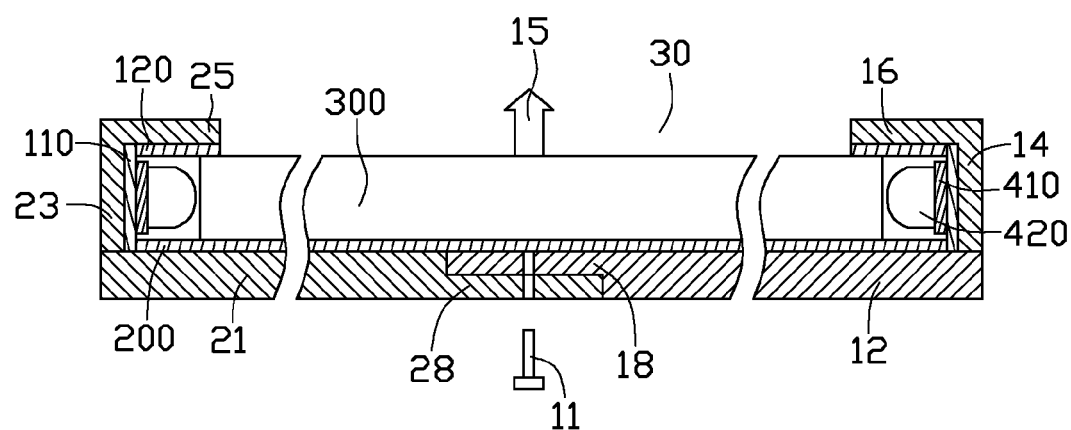
FIG. 2 is an assembled, cross-sectional view of the side light type backlight module with the back plate assembly of FIG. 1.

Referring to FIGS. 1 and 2, a side light type backlight module is illustrated in accordance with a first embodiment of the disclosure. The side light type backlight module comprises a reflection plate 200, a light guiding plate 300, two light source modules 400, and a back plate assembly 100 for receiving the light source modules 400, the reflection plate 200 and the light guiding plate 300 therein. The back plate assembly 100 defines a window 30 at a top portion thereof. The light source modules 400 are respectively installed at two opposite sides of the light guiding plate 300 so as to radiate light to the light guiding plate 300 through the two opposite sides thereof. The light guiding plate 300 guides the light radiated from the light source modules 400 out of the window 30 of the back plate assembly 100. The reflection plate 200 is installed at a bottom side of the light guiding plate 300 for reflecting the light leaking from the light guiding plate 300 toward the window 30, thereby improving the light outputting efficiency of the backlight module. The reflection plate 200 totally covers a bottom surface of the light guiding plate 300. The light radiated from the light source modules 400 is changed to a surface light source by the light guiding plate 300 and the reflection plate 200.

The back plate assembly 100 comprises a first case 10 and a second case 20 assembling with the first case 10. The first case 10 comprises a first main plate 12, a first side plate 14 perpendicularly and upwardly extending from a first end of the first main plate 12 and a first pressing plate 16 perpendicularly and inwardly extending from a free end of the first side plate 14. A bottom portion of a second end opposite to the first end of the first main plate 12 is cut away to form a first stepped portion 18. The first stepped portion 18 defines a plurality of first threaded holes 19 for bolts 11 extending therethrough to connect the first and second cases 10, 20 together. The first pressing plate 16 is parallel to the first main plate 12, and has a length less than that of the first main plate 12.

The second case 20 has a configuration substantially similar to the first case 10. The second case 20 comprises a second main plate 21, a second side plate 23 perpendicularly and upwardly extending from a first end of the second main plate 21 and a second pressing plate 25 perpendicularly and inwardly extending from a free end of the second side plate 23. A top portion of a second end opposite to the first end of the second main plate 21 is cut away to form a second stepped portion 28. The second stepped portion 28 defines a plurality of second threaded holes 29 for the bolts 11 extending therethrough. The second main plate 21, the second side plate 23 and the second pressing plate 25 of the second case 20 are similar to the first main plate 12, the first side plate 14 and the first pressing plate 16 of the first case 10, respectively. The second pressing plate 25 is parallel to the second main plate 21, and has a length less than that of the second main plate 21. Due to lengths of the first and second pressing plates 16, 25 being less than those of corresponding first and second main plates 12, 21, the back plate assembly 100 defines the window 30 at the top portion thereof. The difference between the first and second case 10, 20 is that the first stepped portion 18 is formed at the top portion of the second end of the first main plate 12 and the second stepped portion 28 is formed at the bottom portion of the second end of the second main plate 21.

In manufacturing the back plate assembly, a semi-finished case is first formed. The semi-finished case includes a main plate, a side plate and a pressing plate respectively similar to the first main plate 12, the first side plate 14 and the first pressing plate 16 of the first case 10, except that main plate of the semi-finished case has a flat bottom surface and a flat top surface throughout. A top portion of a free end of the main plate of the semi-finished case is cut away to form the second case 20 having the second stepped portion 28, and a bottom portion of a free end of the main plate of the semi-finished case is cut away to form the first case 10 having the first stepped portion 18. From the above, the first and second cases 10, 20 can be in mass production. This decreases an amount of parts of the back plate assembly, thereby reducing manufacturing cost of the backlight module and difficulty of assembling the backlight module in accordance with the present disclosure.

The light source modules 400 are respectively mounted to inner sides of the first and second side plates 14, 23. Each of the light source modules 400 is elongated, and comprises a printed circuit board 420 and a plurality of light-emitting units 410 attached on a first side of the printed circuit board 420. A second side opposite to the first side of each of the printed circuit boards 420 is attached to the inner side of a corresponding one of the first and second side plates 14, 23. It is understood that the light source modules 400 may be LED modules each comprising a printed circuit board and multiple LEDs. To dissipate heat generated by the light source modules 400, two elongated heat dissipation sheets 110 are sandwiched between the first and second side plates 14, 23 and corresponding printed circuit boards 420, respectively. The heat dissipation sheets 110 can be made of materials with high heat conductivity, such as aluminum or copper. Each of the heat dissipation sheets 110 has an upper side extending to an inner side of a corresponding one of the first and second pressing plates 16, 25, and a lower side extending to an inner side of a corresponding one of the first and second main plates 12, 21; that is to say, each of the heat dissipation sheets 110 covers the whole inner side of the corresponding one of the first and second side plates 14, 23. Two elongated reflection sheets 120 are respectively attached to the inner sides of the first and second pressing plates 16, 25 for reflecting the light thereon towards the reflection plate 200. Each of the reflection sheets 120 has a first end thereof extending to engage with an outer surface of a corresponding heat dissipation sheet 110 and a second end opposite to the first end thereof and extending to a position under and aligning with a free end of a corresponding one of the first and second pressing plates 16, 25.

The first stepped portion 18 of the first case 10 is complementary to the second stepped portion 28 of the second case 20; that is, when the first and second stepped portions 18, 28 overlap each other, continuously flat top and bottom surfaces are respectively and cooperatively formed by top surfaces and bottom surfaces of the first and second main plates 12, 21. In other words, a total thickness of the overlapped first and second stepped portions 18, 28 is identical to the thickness of each of the first and second main plates 12, 21. Amount and size of the first threaded holes 19 of the first case 10 are identical to those of the second threaded holes 29 of the second case 20. The first and second threaded holes 19, 29 correspond to each other. The bolts 11 extend through the second and first threaded holes 29, 19 sequentially, thereby assembling the stepped portions 18, 28 together, so that the first and second cases 10, 20 are assembled together. At the same time, the first stepped portion 18 totally covers the second stepped portion 28, and none of the bolts 11 extend beyond the first stepped portion 18 of the first case 10, for preventing the bolts 11 from interfering with the assembly of the reflection plate 200. A length of each of the bolts 11 is not larger than the total thickness of the first and second stepped portions 18, 28. The reflection plate 200 is attached to the top surfaces of the first and second main plates 12, 21. Two opposite ends of the reflection plate 200 abut against the heat dissipation sheets 110. The light guiding plate 300 is located over the reflection plate 200, and two opposite ends of the light guiding plate 300 are respectively located under the first and second pressing plates 16, 25 and the reflection sheets 120, whereby the light guiding plate 300 and the reflection plate 200 are mounted in the back plate assembly 100. In this manner, each of the light source modules 400 is surrounded by a corresponding reflection sheet 120, a corresponding heat dissipation sheet 110 and a corresponding side of the light guiding plate 300. In use, the reflection sheets 120 and the reflection plate 200 reflect the light emitted from the light source modules 400 towards the window 30 in form of a surface light source 15.

Figure 3:
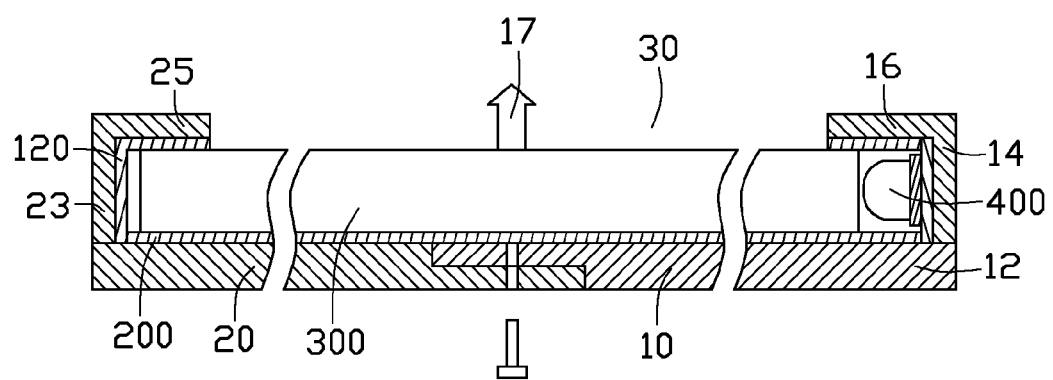
FIG. 3 is an assembled, cross-sectional view of a side light type backlight module with a back plate assembly in accordance with a second embodiment of the disclosure.

Referring to FIG. 3, a side light type backlight module is illustrated in accordance with a second embodiment of the disclosure. The side light type backlight module of the second embodiment is similar to the side light type backlight module of the first embodiment. The difference between the side light type backlight modules of the first and second embodiments is that only one light source module 400 is disposed in the side light type backlight module of the second embodiment. The light source module 400 is attached to the inner side of the first side plate 14 of the first case 10. None light source module and heat dissipation sheet is mounted on the inner side of the second side plate 23 of the second case 20. An L-shaped reflection sheet 120 is attached to the inner side of the second pressing plate 25 and extends downwards along the inner side of the second side plate 23 of the second case 20 to thereby cover the inner sides of the second side plate 23 and the second pressing plate 25 of the second case 20. Accordingly, the opposite ends of the reflection plate 200 abut the reflection sheet 120 attached to the second side plate 23 and the heat dissipation sheet 110 attached to the first side plate 14, respectively. The reflection sheets 120 and the reflection plate 200 reflect the light emitted from the light source module 400 towards the window 30 in form of a surface source 17. Alternatively, it is understood that only a light source module 400 may be disposed on the second side plate 23 of the second case 20.

In the first and second embodiments, two first shell-shaped baffles 500 (only one shown) are disposed at two opposite sides of the first case 10, and two second shell-shaped baffles 510 (only one shown) similar to the baffles 500 are disposed at two opposite sides of the second case 20. When the first case 10 is assembled with the second case 20, the first baffles 500 of the first case 10 are inserted into corresponding second baffles 510 of the second case 20 to prevent the light guiding plate 300 and the reflection plate 200 from escaping from the back plate assembly 100. It is understood that in an alternative embodiment, two integral, individual and elongated baffles, which are used to replace the four baffles 500, 510, can be mounted at two opposite sides of the back plate assembly 100, after the first case 10 is assembled with the second case 20, for preventing the light guiding plate 300 and the reflection plate 200 from escaping from the back plate assembly 100.

To disassemble the side light type backlight module only needs to loosen the bolts 11 away from the first and second cases 10, 20; thus, the disassembly of the backlight module can also be conveniently achieved.

It is to be understood, however, that even though numerous characteristics and advantages of the disclosure have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A side light type backlight module comprising:
 a first case comprising a first main plate and a first bent plate extending upwardly from a first end of the first main plate, the first main plate extending laterally a first stepped portion from an upper portion of a second end opposite to the first end of the first main plate;
 a second case comprising a second main plate and a second bent plate extending upwardly from a first end of the second main plate, the second main plate extending laterally a second stepped portion from a lower portion of a second end opposite to the first end of the second main plate, the second stepped portion of the first case being covered by the first stepped portion of the first case;

a plurality of bolts extending through the second stepped portion and the first stepped portion and securing the first and second cases;

a light source module attached to an inner side of the first bent plate of the first case; and a light guiding plate received in an inner space cooperatively defined by the first case and the second case, light generated by the light source module entering the light guiding plate from a lateral side thereof and leaving the light guiding plate from a surface of the light guiding plate facing away from the main plates of the first and second cases, wherein the first bent plate of the first case comprises a first side plate extending upwardly from the first end of the first main plate and a first pressing plate extending inwards from a free end of the first side plate, the second bent plate of the second case comprising a second side plate extending upwardly from the first end of the second main plate and a second pressing plate extending inwards from a free end of the second side plate, the first and second pressing plates being positioned above the light guiding plate, the light source module being located at a lateral side of the light guiding plate, the first bent plate and the light guiding plate surrounding the light source module;

a reflection plate attached on the first and second main plates of the first and second cases, wherein the light guiding plate is located over the reflection plate; and a bent reflection sheet attached to inner surfaces of the second side plate and the second pressing plate of the second bent plate and a flat reflection sheet attached to an inner surface of the first pressing plate, wherein the flat reflection sheet is located near the light source module, the flat reflection sheet and the bent reflection sheet reflecting the light emitted from the light source module.

2. The side light type backlight module of claim 1, wherein each of the first case and the second case forms two shelled-shaped baffles at two opposite sides thereof, for preventing the light guiding plate and the reflection plate from escaping from the first and second cases along a lateral direction.

* * * * *